United States Patent
Parker (10) Patent No.: US 6,985,070 B1
(45) Date of Patent: Jan. 10, 2006

(54) BIOMETRIC AUTHENTICATION OF HOSPITALITY-SITE CUSTOMERS

(75) Inventor: Benjamin James Parker, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 301 days.

(21) Appl. No.: 10/314,850

(22) Filed: Dec. 9, 2002

(51) Int. Cl.
*H04Q 9/00* (2006.01)
*B60R 25/00* (2006.01)
*G06F 17/60* (2006.01)

(52) U.S. Cl. .................. 340/5.33; 340/5.7; 340/5.6; 340/5.52; 340/5.53; 340/5.82; 340/5.83; 705/5

(58) Field of Classification Search .............. 340/5.33, 340/5.7, 5.6, 825.28, 5.52, 5.53, 5.83, 5.82; 705/5
See application file for complete search history.

(56) References Cited

U.S. PATENT DOCUMENTS

| | | | | |
|---|---|---|---|---|
| 5,245,329 A | * | 9/1993 | Gokcebay | 340/5.33 |
| 5,903,225 A | * | 5/1999 | Schmitt et al. | 340/5.25 |
| 5,959,541 A | * | 9/1999 | DiMaria et al. | 340/5.52 |
| 5,995,014 A | * | 11/1999 | DiMaria | 340/5.52 |
| 6,307,956 B1 | * | 10/2001 | Black | 382/124 |
| 6,441,723 B1 | * | 8/2002 | Mansfield et al. | 340/310.01 |
| 6,498,861 B1 | * | 12/2002 | Hamid et al. | 382/124 |
| 6,504,470 B2 | * | 1/2003 | Puchek et al. | 340/5.53 |
| 6,504,479 B1 | * | 1/2003 | Lemons et al. | 340/541 |

OTHER PUBLICATIONS

Copending application entitled "Personalized Hospitality Management System" filed on Nov. 26, 2002 by inventors Brian Huey, Benjamin Parker, Rick Hulett, and Randolph Heiser, delivered via express mail No. EV141463822 for which a nonpublication request was submitted.

* cited by examiner

*Primary Examiner*—Michael Horabik
*Assistant Examiner*—Scott Au (57) ABSTRACT

A method and system for checking a guest into a hospitality site is provided. A biometric sample is captured from a guest using a biometric-sample-capture device to create a portable biometric profile. The biometric sample is compared to a biometric sample previously stored in a memory location. If the guest is authenticated, he/she is approved for check-in. A user profile can be retrieved that has a set of user preferences. These user preferences can then be used to customize the guests stay at the hospitality site. Many hospitality sites can remotely access the biometric profile to effect authentication.

43 Claims, 4 Drawing Sheets

BIOMETRIC AUTHENTICATION OF HOSPITALITY-SITE CUSTOMERS

STATEMENT REGARDING FEDERALLY SPONSORED RESEARCH OR DEVELOPMENT

Not applicable.

CROSS-REFERENCE TO RELATED APPLICATIONS

Not applicable.

TECHNICAL FIELD

This invention is related to the field of biometric authentication and hospitality sites. More particularly, the present invention provides a new and useful method and system for using biometric authentication to check guests into a hospitality site and to customize the attributes of the site based on a user profile.

BACKGROUND OF THE INVENTION

Hospitality sites require some form of check-in process. Exemplary hospitality sites include hotels, motels, apartment complexes, time-share facilitates, hospitals, and cruise ships. The check-in process to a hospitality site can be arduous. Lines of patrons form as hospitality sites struggle to authenticate guests and receive their individual requests. Consider a cruise-ship experience.

A cruise is often an expensive engagement. Costing hundreds and even thousands of dollars, a cruise as sold on catering to the individual. The cruise offers an "all-inclusive" type experience where much of the guests' necessities are included in the purchase price. Patrons often travel by plane from a home city to board the ship. After arriving at the dock, guests must wait in long lines to have their credentials authenticated and to submit or confirm any personal requests. The current state of the art requires guests to arrive several hours in advance to allow for the time necessary to check in. There is much at stake in making sure that first, the right patron is checked in and second, that the patron is checked in properly.

Unscrupulous persons can duplicate travel tickets and identifying information such as a driver's license, a passport, or birth certificate. Modern-day stowaways prey on the unwary and can steal an unsuspecting victim's vacation. The present state of the art could be improved by providing a more dependable authenticating system for checking people into hospitality sites. But authentication alone is not enough to meet the expectations of guests.

Guests have high demands and expect individual attention. Guests expect amenities that they will enjoy. Cruises attract people from all over the world. A cruise liner does not have the luxury of offering American festivities and English-only menus. Many patrons end up waiting to make special requests until check-in. Moreover, time is of the essence as the cruise ship must disembark at a precise time to stay on a meticulously planned schedule. Guests will not book future cruises if they have to wait in long lines, payment is not handled properly, and/or room assignments are erroneous.

The nonexhaustive list of inefficiencies provided above are not limited to the cruise industry. Rather, hotels, time-shares, etc., are plagued by inefficient check-in procedures, identity theft, and mundane amenity offerings.

The medical industry also suffers from shortcomings of current admittance procedures, especially in emergency situations. Identifying a patient quickly can improve medical treatment and even save lives. But today, there is no way to rapidly identify a patient if the patient does not have identifying indicia on him/her. Without this identifying information, and relevant medical data, medical professionals have to either guess or perform tests to determine the best course of treatment. Guessing leads to errors and performing tests take time, time that could be better spent assisting the patient. There is a need to rapidly identify patients and obtain relevant medical information.

The current state of the art could be improved by providing a system that allows multiple hospitality sites to access a portable biometric profile that accurately and efficiently identifies persons or groups. Further, it would be useful to more efficiently communicate a guest's preferences to a hospitality site in association with the biometric profile.

SUMMARY OF THE INVENTION

The present invention solves at least the above problems by providing a system and method for efficiently checking a guest into a hospitality site and personalizing the guest's experience based on a user profile. Offering several practical applications in the technical arts, the present invention, among other things, enables hospitality sites to decrease the likelihood of checking in the wrong guest, to decrease check-in time, and to personalize a guest's stay. Moreover, in medical settings, the present invention can rapidly identify a patient and provide relevant medical data to health professionals.

In a first aspect of the invention a method for checking a guest into a hospitality site includes capturing a biometric sample from the guest using a biometric-sample-capture device, comparing the biometric sample against a previously stored biometric sample, and approving check-in of the guest.

To personalize a guest's stay, a user profile associated with the guest is communicated to the hospitality site. The user profile contains a large set of preferences set by the guest. This profile can be used in a variety of applications. Here, the data is captured and used by the hospitality site to personalize its amenities offered to guests.

In another aspect of the invention, a system for authenticating and providing personal hospitality services to a guest is provided. The system includes at least a memory component that stores a biometric profile of the guest, a biometric-sample-capture component coupled to the memory component, and a profile-based management system coupled to the biometric-sample-capture component for personalizing various services available to the guest.

BRIEF DESCRIPTION OF THE SEVERAL VIEWS OF THE DRAWINGS

The present invention is described in detail below with reference to the attached drawing figures, wherein:

FIG. 2A is a flowchart illustrating an enrollment process for taking advantage of biometric check-in;

DETAILED DESCRIPTION OF THE INVENTION

The present invention provides an improved method and system for checking guests into hospitality sites and customizing their stay. Using the present invention, a hospitality site can offer its guests the option of accessing a biometric-capture device, receiving a room key, and having their stay personalized automatically.

The present invention will be described more fully with reference to the accompanying figures where exemplary embodiments of the invention are shown. The present invention should not be construed as limited to those embodiments. Rather, the described embodiments are illustrative in nature.

As one skilled in the art will appreciated, the present invention may be embodied as, among other things: a method, a date-communications system, or a computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium to operate a biometric-sample component and related databases.

Computer-readable media include both volatile and non-volatile media, removable and nonremovable media, and contemplates media readable to a database, a switch, and various other network devices. By way of example, and non limitation, computer-readable media may comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to: RAM, ROM, EEPROM, flash memory or other memory technology, CD-ROM, digital versatile disks (DVD), holographic media or other optical storage media, magnetic cassettes, magnetic tape, magnetic disk storage, and other magnetic storage devices.

Communications media typically embody computer-useable instructions—including data structures and program modules—in a modulated data signal. The term "modulated date signal" refers to a propagated signal that has one or more of its characteristics set or changed to encode information in the signal. An exemplary modulated data signal includes a carrier wave or other transport mechanism. Communications media include any information-delivery media. By way of example but not limitation, communication media include: wired media, such as a wired network or direct-wired connection, and wireless media such as acoustic, infrared, radio, microwave, spread-spectrum, and other wireless-media technologies. Combinations of the above are included within the scope of computer-readable media.

Biometric Authentication

Figure 1:
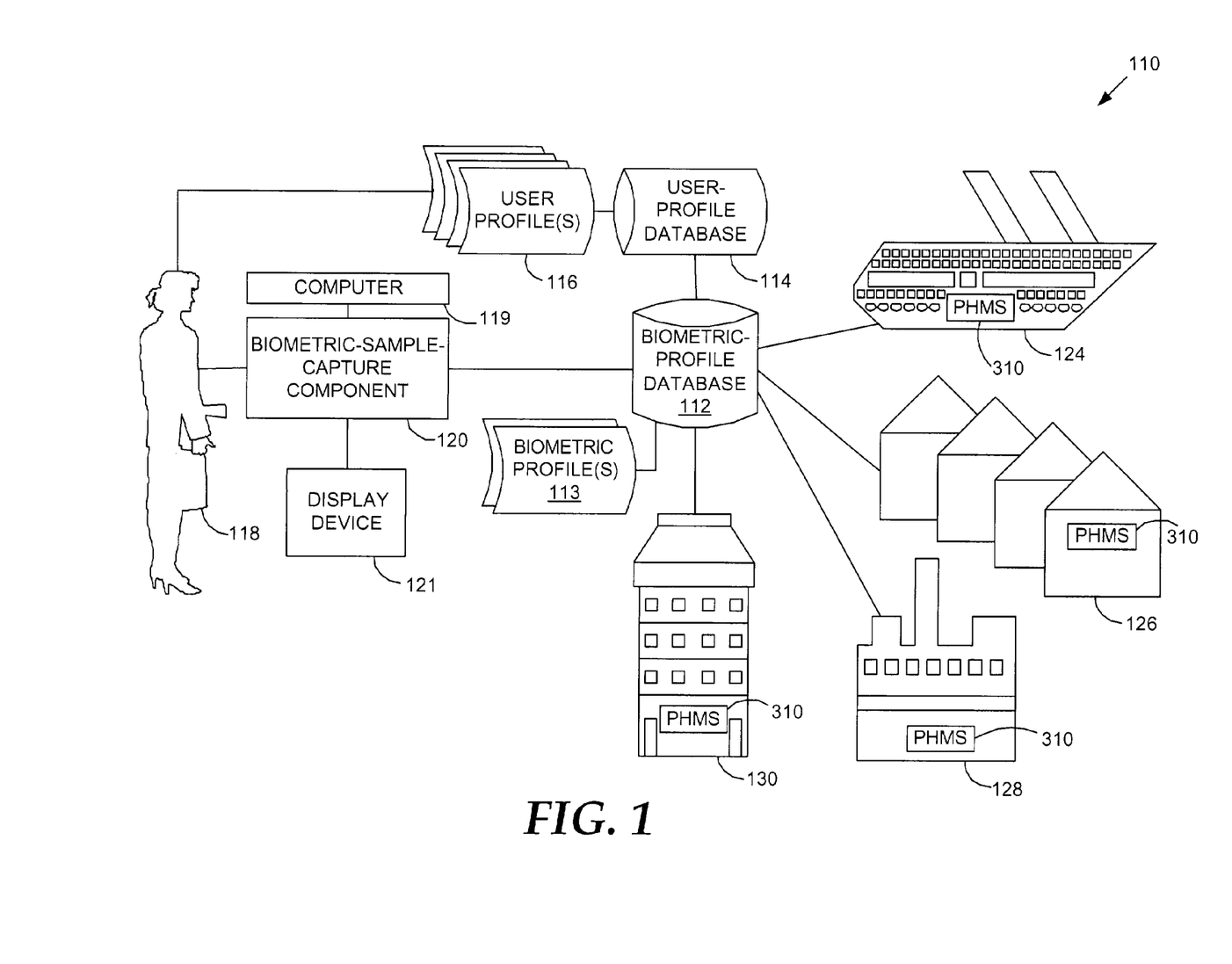
FIG. 1 is a block diagram of an exemplary operating environment suitable for practicing the present invention.

Turning now to FIG. 1, an exemplary operating environment for practicing the present invention is referenced generally by the numeral 110. Operating environment 110 includes a biometric-profile database 112 for storing a plurality of biometric profiles 113 and is coupled to a user-profile database 114, which stores a plurality of user profiles 116. Each biometric profile 113 includes at least a biometric sample. A patron 118 uses a biometric-sample-capture component (BSCC) 120 to provide a biometric sample, which is stored in biometric profile 113. Biometric-profile database 112 can store multiple biometric samples of varying types. The biometric profile 113 is optionally accessible by multiple hospitality sites; and because it is portable, it can be transferred to one or more sites.

In one embodiment, BSCC 120 is coupled to a conventional computer 119 and a display device 121 to facilitate accepting and processing of biometric samples. Biometric-profile database 112 is coupled to a plurality of hospitality sites. Exemplary hospitality sites include, a cruise ship 124, a timeshare site 126, a hospital 128 or a hotel 130. Other hospitality sites include nursing homes, college dormitories, and other places of temporary accommodation. Those skilled in the art will appreciate still other hospitality sites to which the present invention is applicable. Each site could be equipped with a personal hospitality management system (PHMS) 310, which is explained in greater detail below with reference to FIG. 3.

The various connections between the components of FIG. 1 are not to be interpreted as direct connections, although they could be. The paths shown can pass through various networks, public or private, such as Local-Area Networks (LANs), Wide-Area Networks (WANs), or the Internet. These networks are not depicted for sake of simplicity and to highlight the more novel features of the present invention. In the preferred embodiment, both databases 112 and 114 are accessible by multiple hospitality sites across a public network such as the Internet. Data is communicated in a secure means such as via Secure Socket Layer (SSL) or secure copy. The profits 113 and 116 could be encrypted. The profiles could be accessed remotely or communicated to the hospitality site. Communicating the profile to the hospitality site would decrease profile-access time by the hospitality site's local systems.

In an alternative embodiment, user-profile database 114 and biometric-profile database 112 are located locally, at each hospitality site. Only that hospitality site would have access to the user profiles 116 and biometric profiles 113. In still another embodiment, the databases 112 and 114 are remotely located, but access is selectively limited. Access can be limited to a chain of hospitality sites or limited consistent with user preferences.

The biometric-profile database 112 is a database for storing, among other things, the biometric profile 113 of patron 118. A biometric sample is captured via BSCC 120. BSCC 120 could include a variety of biometric systems, such as a fingerprint-recognition system, a facial-recognition system, an eye-scanning system, a voice-recognition system, a DNA-recognition system, a breath-recognition system, and/or a hand-geometry-identification system. The aforementioned system do not compose an exhaustive list. Those skilled in the art will appreciate alternative systems that could be used to take biometric samples.

Figure 2A:
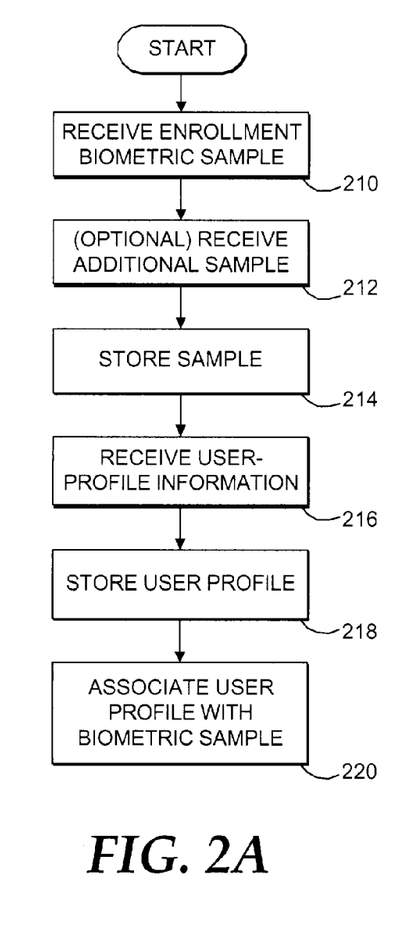

Turning now to FIG. 2A, an exemplary enrollment process is illustrated. At a step 210, biometric profile 113 is populated with a biometric sample from guest 118 received via BSCC 120. This biometric profile 113 will be used as a benchmark to identify patron 118. The biometric profile 113 can be received in a variety of ways. For example, a previously stored biometric sample could be transmitted to biometric-profile database 112 by guest 118 via the Internet. Alternatively, the biometric sample could be captured on-site and saved directly to the biometric-profile database 112. At an optional step 212 an additional biometric sample is received. Receiving a second biometric sample acids in accurate, future identification of guest 118. At a step 214, the biometric sample is stored in biometric-profile database 112. In a preferred embodiment, the connections involving the biometric database are secure connections. Biometric-profile database 112, however, need not be remotely located. Rather, biometric-profile database 112 (as well as user-profile database) may reside in computer, such as computer 119, connected directly to BSCC 120 or to BSCC 120 via a local network.

At a step 216, user-profile information is received. Guest 118 can populate user-profile 116 in a variety of ways, which will be explained in greater detail below. The user profile includes a wide array of information personal to guest 118. Again, greater detail of the user-profile and the personal hospitality management system 310 in general will be provided below. The user-profile is then stored in user-profile database 114 at a step 218. Guest 118 does not need to wait to populate his or her user profile 116 until after submitting a biometric sample. The user-profile 116 is preferably populated before the submission of a biometric sample. Finally, the biometric sample is associated with the respective user-profile 116 stored in use-profile database 114. User-profile database 114 and biometric-profile database 112 can be a single database. With his/her biometric profile 113 stored, guest 118 can check into a hospitality site by merely submitting a biometric sample.

Figure 2B:
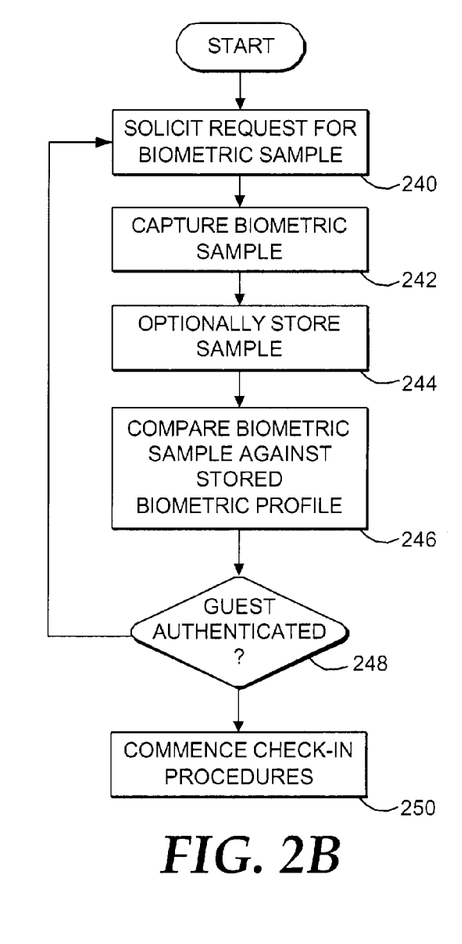
FIG. 2B is a flowchart illustrating a process for checking a guest into a hospitality site using the present invention.

Turning now to FIG. 2B, an exemplary method for automatically checking a hospitality-site guest into a hospitality site is illustrated in flowchart form. At a step 240, BSCC 120 requests a biometric sample. Typically aspect 118 approaches BSCC 120 to submit a biometric sample. The BSCC 120 will capture the biometric sample at a step 242. At an optional step 244 the biometric sample can be stored in a memory location. Although it is not necessary to store the biometric sample, it may be advantageous to store the biometric sample for future recall. At a step 246, the biometric sample is referenced against the biometric profile 113 stored during enrollment. Thus, at a step 248, a determination can be made as to whether the guest can be authenticated.

If the guest is authenticated, check-in procedures will commence at a step 250. If the guest cannot be authenticated, then processing returns to step 240 where a biometric sample is again requested. Check-in procedures can include providing a room-access device such as a key or magnetic-stripped cared. Billing information can be immediately provided to the guest via display device 121 to enable guest 118 to confirm a billing agreement made at the point of sale. In addition, payment information can be processed. After the guest has been authenticated, his or her user-profile 116 can be retrieved from user-profile database 114. Upon receiving user profile 116, the PHMS 310 can customize the guest's stay at the hospitality site based on the user-profile 116.

Figure 3:
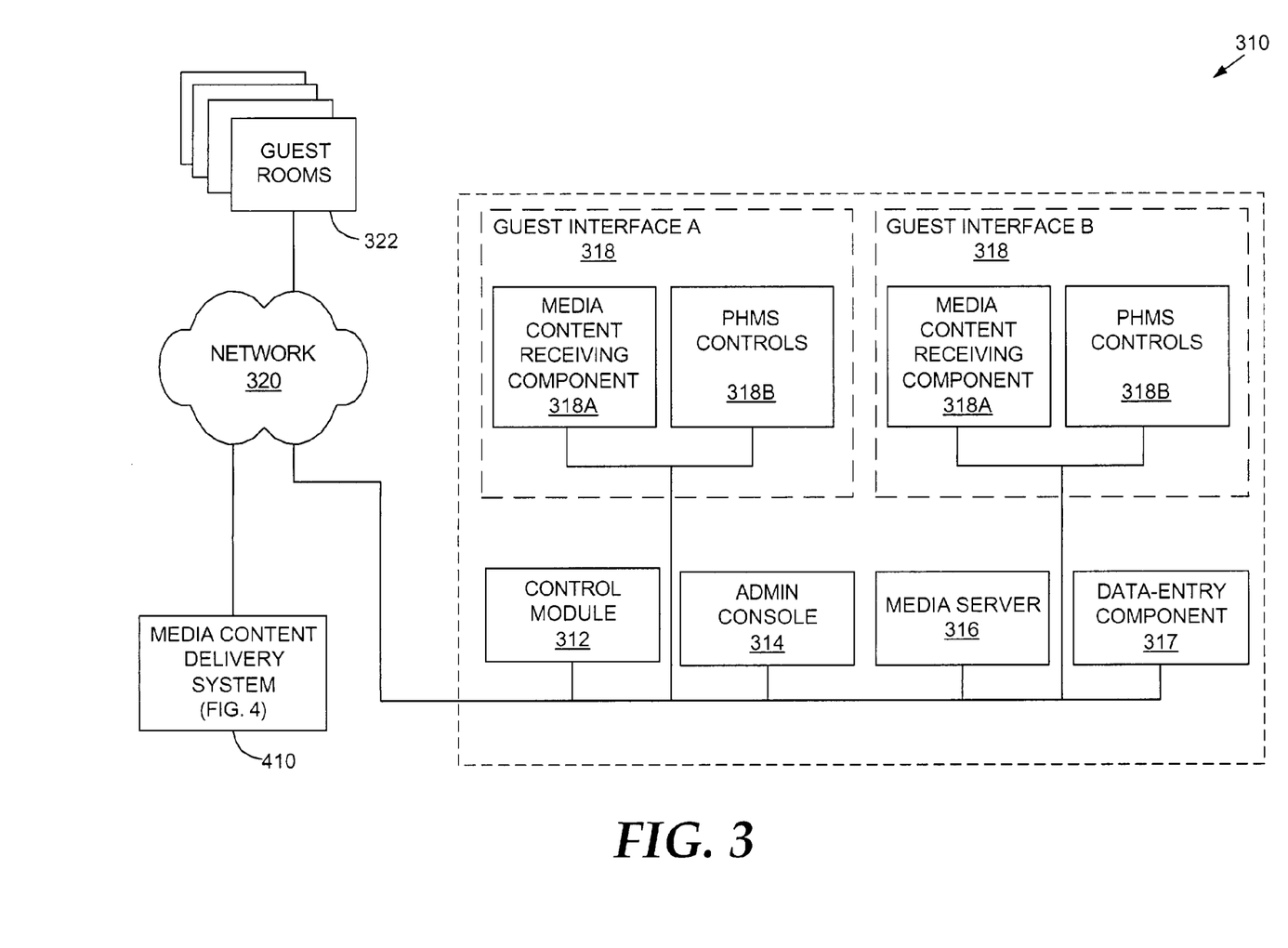
FIG. 3 is a block diagram illustrating a personal hospitality management system in greater detail.

Turning now to FIG. 3, an exemplary personal hospitality management system is provided and referred by the numeral 310. PHMS 310 controls and customizes many aspects of facility amenities, media offerings, and guest-room attributes. The ability to control media offerings enables more particular tracking and billing of media consumed by the guest. Furthermore, PHMS 310 may originally be programmed with guest information, but it can also learn guests' likes and dislikes by monitoring guest behavior. The user profile 116 is not solely affiliated with PHMS 310. Rather, user-profile 116 is received by PHMS 310 to personalize a guest's stay.

FIG. 3 depicts the major systems involved in a property-management system suitable for implementing the present invention. PHMS 310 has several components, including a control module 312, an administrative console 314, a media server 316, a data-entry component 317, and one or more guest interfaces 318.

Control module 312 controls and monitors the PHMS. The control module is the decision-making mechanism for PHMS. As one skilled in the relevant art would appreciate, control module 312 includes computer-readable code stored and executed in many possible ways including residing on a dedicated computer locally or remotely, residing on media server 316, or residing on another server elsewhere in the system. Control module 312 controls the PHMS and makes decisions based on user-profile information located in user-profile 116 and instructions from administrative console 314. Control module 312 is responsible for carrying out the directives of administrative console 314.

Administrative console 314 is responsible for allocating an individual user-rights to control and monitor all or parts of the PHMS system. For example, a hotel manager may need greater control and monitoring capabilities than a hotel-minibar stocker, who may only need to check guest minibar preferences and usage. Control module 312 can also be programmed through administrative console 314 if the user has the appropriate authority.

Media server 316 stores media content, preferably received from media content delivery system (MCDS) 410, discussed in greater detail with reference to FIG. 4. Media content may be stored on media server 316 from many other sources including the Internet and a media player, such as a DVD player or VCR. Methods of storing media on servers are conventional in nature. Media is selected for storage based on the user profiles 116 of hospitality-site guests. For instance, one guest may desire to watch a particular Japanese cartoon. Before or during the guest's stay, control module 312 or the hotel's staff negotiates with a media-content provider for the reception of the desired media selection. When the guest arrives, his room is configured to receive the cartoon based on his user profile.

Data-entry component 317 is used to populate user-profile database 114. Data-entry component 317 captures guest information and communicates it to user-profile database 114. Data-entry component 317 contemplates guest interaction, such as a guest entering user-profile information over the Internet. Data-entry component 317 is also capable of gathering guest information using behavioral-data-collection- and pattern-recognition techniques. As would be appreciated by one skilled in the art, data-entry component 317 could assume a variety of forms including a computer, terminal, a kiosk, a telephony device, a television, a personal data assistant, a consumer electronics device, a speaker, a guest-monitoring application, and a default-settings programming device.

In a preferred embodiment, the desired media selection is received and stored on media server 316 until the hotel guest requests to view the selection. In addition to storing media content for guest viewing, media server 316 also dynamically stores media content such as television channels from MCDS 410 in a network-compatible format. It then transmits the media via control module 312 based on user-profile preferences. For instance, one guest may only desire to view sports channels. Another guest may only be interested in news channels. Those channels are provided to the respective guests.

For each guest, control module 312 optionally distills all available media down to only the desired media based on user profile 116. Only the requested media content is offered to the guest. Guests, if desired, can then view their media selections without wading through dozens of unwanted channels. In this way, the guest realizes a significant convenience via a system requiring less information to be transmitted than currently exists in the prior art. Control module 312 can account for all media sent to media content receiving component (MCRC) 318A. The guest can then be billed for the media consumed. Control module 312 can compile a list of all media consumed throughout a hospitality site for a given period of time. Guests have the option of updating their user-profile preferences at any time.

Guest interface 318 receives information and commands from other PHMS components and creates part of the guest-specified desired environment as stored in user-profile database 114. Guest interface 318 can also collect data on guest activity that is then sent to the appropriate PHMS component. Guest interface 318 comprises MCRC 318A and PHMS controls 318B.

MCRC 318A receives media content in a network-compatible protocol and creates the appropriate media for the user. A preferred embodiment users a television and a set-top device. A set-top device receives IP packets containing media information and converts the information to a National Television System Committee (NTSC) format that is transmitted to the television. The set-top device receives user input from a remote control and transmits the information to the appropriate PHMS control component.

PHMS controls 318B are located throughout a PHMS-equipped facility. PHMS controls 318B are responsible for customizing the environment a particular guest experiences during their visit. PHMS controls 318B receive instructions from and provide feedback to control module 312, typically via network 320. In addition to providing feedback on the hospitality-site environment, such as the temperature of a particular hot tub, the PHMS controls 318B also act as points of data generating on user activity.

PHMS controls 318B include controls for customizing facility amenities, guest rooms, media transmission, and guest tracking. Facility-amenity controls customize the services offered to a guest and the environment experienced by a guest throughout the hospitality site. Facility-amenity controls include wake-up-time controls, check-out controls, incentive-program controls, health-club-usage controls, facility-access controls, minibar controls, Internet-access controls, telephony controls, business-services controls, parking controls, special-assistance services controls, and laundry controls.

Guest-room controls customize a guest's environment within a guest room. Guest-room controls include Internet-access controls, Internet-home-page controls, room-lighting controls, room-temperature controls, aroma controls, wake-up-time controls, convenience controls, and room-ventilation controls.

Media-transmission controls customize the media selections available to a guest. Media-transmission controls include television-channel controls, volume controls, language controls, service-duration controls, viewing controls, ratings controls, protocol controls, and format controls.

Guest-tracking controls monitor the location of a guest throughout the managed property and send this information back to control module 312. This information can then be used for customizing the facility-amenity and media-transmission controls located in the hospitality site, as appropriate. For instance, if the guest that prefers news channels and the guest that prefers sports channels happened to be working out in a hotel's health club at the same time, the media-transmission controls would alter the media transmitted in the health club accordingly.

Hospitality site 310 is connected to a computer network 320. Network 320 is preferably a WAN, but could also be a LAN or the Internet. The guest rooms 322 are coupled to PHMS 310 via network 320. User-profile database 114 stored the user profiles at 116, which contain guest information. In addition to information such as billing, address, and activity logs, the guest information stored in a user profile includes user preferences, not limited to facility-amenity preferences, room-environment preferences, and media preferences.

Examples of facility-amenity preferences include, but are not limited to, wake-up-time preferences, check-out preferences, incentive-program preferences, health-club-usage preferences, room-location preferences, facility-access preferences, minibar preferences, Internet-access preferences, telephony preferences, concierge-desk preferences, business-services preferences, parking preferences, special-assistance services preferences, and laundry preferences.

Room-environment preferences include, but are not limited to home-page preferences, room-lighting preferences, décor preferences, room-temperature preferences, eating preferences, room-service preferences, convenience preferences, room-location preferences, sleeping-arrangement preferences, aroma preferences, bathroom-amenity preferences and smoking preferences.

Exemplary media preferences include television-channel preferences, language preferences, genre preferences, service-duration preferences, viewing preferences, topic preferences, rating preferences, actor preferences, style preferences, era preferences, artist preferences, protocol preferences, and format preferences.

Additional hospitality sites, such as sites 124, 126, and 128, can access user-profile database 114 as well as biometric-profile database 112. Guest information available to one hospitality site is made available to all hospitality sites connected to user-profile database 114.

Figure 4:
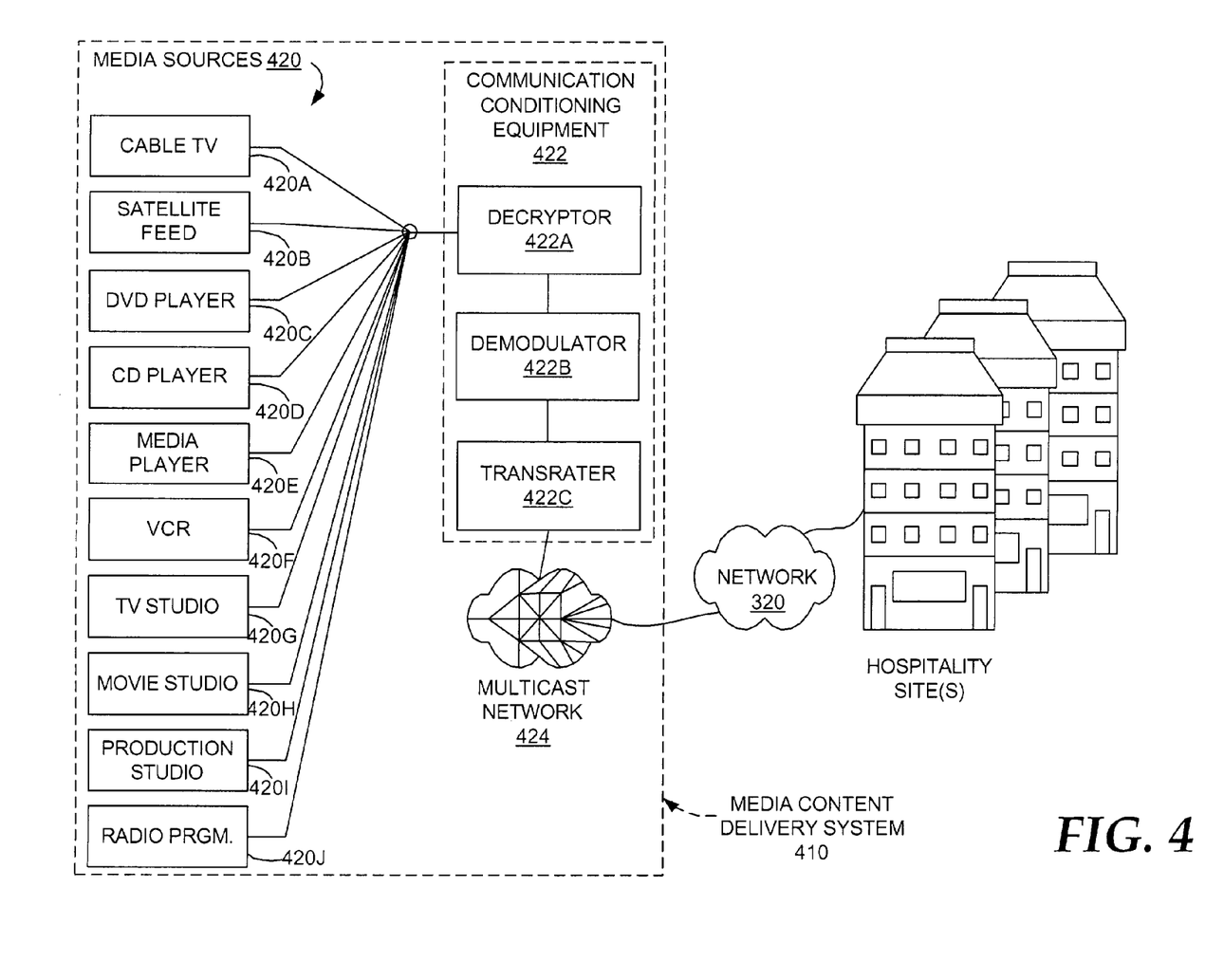
FIG. 4 depicts a media content delivery system used in the present invention, in greater detail.

FIG. 4 is a block diagram that depicts the hospitality-site components in greater detail. As previously described, MCDS 410 communicates media information in a network-compatible format. This media information is communicated over network 320. Network 320 is also connected to hospitality site 320; and in turn to control module 312, data-entry component 317, administrative console 314, media server 316, guest interface 318, and user-profile database 114.

An MCDS 410 delivers all forms of media, audio and visual, in a network-compatible format. MCDS 410 can also send other forms of data. Preferably, the media information and data are communicated as Internet Protocol (IP) packets. One skilled in the relevant art would appreciate the array of available protocols, not limited to a Transmission Control Protocol/Internet Protocol (TCP/IP), a File Transfer Protocol (FTP) a Hypertext Transfer Protocol (HTTP), and an International Telecom Union (ITU) protocol. The media information could also be sent in a proprietary protocol or any other protocol that can be used in a computer network. In addition to media content, data can also be communicated over MCDS 410.

MCDS 410 communicates media content over network 320. As seen in FIG. 4, MCDS 410 includes a number of media sources 420. Media sources 420 supply media content in various forms that is a transformed by other components of MCDS 410 into a network-compatible format. Many acceptable raw-media sources for providing media content exit, not limited to a cable TV transmission 420A, a satellite feed 420B, a Digital Versatile Disc (DVD) player 420C, a Compact Disc (CD) player 420D, a media player 420E, a Video Cassette Recorder (VCR) 420F, a TV studio 420G, a movie studio 420H, a production studio 420I, and a radio program 420J. As would be understood by one skilled in the art, any device capable of transmitting media via electrical, electronic, electromagnetic, or optical signals is an acceptable media source 420 for the MCDS 410.

MCDS 410 communicates information in a network-compatible format. MCDS 410 employs various types of communication-conditioning equipment 422 including a decryptor 422A, a demodulator 422B, and a transrater 422C. Raw-media content from the media sources 420 can be converted into a network-compatible format using some or all of this equipment, as appropriate. Decryptor 422A removes the encryption or "scrambling" of the incoming signal. Demodulator 422B removes the carrier wave from the incoming signal, thus leaving only the original signal before it was modulated with a higher-frequency signal in preparation for transmission. Preferably, the data is communicated in an Asynchronous Serial Interface (ASI) stream feeding into transrater 422C. The data is conditioned and transferred in a form from demodulator 422B that can be converted to data packets that will be communicated over a network. Transrater 422C can receive incoming data at varying rates and transmit outgoing data at desired, selectable rates.

The data packets from transrater 422C are communicated over a multicast network 424. Multicast network 424 comprises multicast routers. Multicate routers are able to send data from one source to multiple destinations. Many hospitality sites can receive the contents of the media packets transmitted from communication-conditioning equipment 422 to multicast network 424.

A preferred embodiment has been described with reference to a hotel hospitality site. But in an alternative embodiment, the system is used in a medical-services environment. A patient can populate his/her user profile 116 with medically related data. The patient populates the user profile 116 with foods that cause allergic reactions, known illnesses, organ-donor information, and the like. The patient may need to be rushed to the emergency room. A biometric sample of the patient is received, his/her identify verified, and user profile 116 retrieved. Relevant medical data is immediately provided to health professionals.

Another contemplated application includes the present invention's use in college dormitories. Biometric authentication is coupled with user-profile management to personalize a resident's stay. Moreover, user profiles 116 can be cross-referenced with other user profiles 116 to pair up students with similar preferences. The amenities offered by the college could then be customized based on the students' preferences.

In still another contemplated application, a cruise ship is equipped with the present invention. Guests submit a biometric sample via a fingerprint and are immediately authenticated or rejected. Their rooms are customized consistent with the data in their user profile 116.

Finally, the present invention is preferably used to check people into a cruise ship. In this embodiment, the BSCC 120 is a handheld, wireless device. Individuals are authenticated while standing in line. User profiles 116 are retrieved and the corresponding cabins are customized to via PHMS 310.

Those skilled in the art will appreciate alternative applications of the present invention based on the instant teachings. As can be seen, the present invention and its equivalents are well adapted to provide a new and useful method for checking guests into a hospitality site and optionally personalizing their stay. Many different arrangements of the various components depicted, as well as components not shown, are possible without departing from the spirit and scope of the present invention.

The present invention has been described in relation to particular embodiments, which are intended in all respect to be illustrative rather than restrictive. Alternative embodiments will become apparent to those skilled in the art that do not depart from its scope.

It will be understood that certain features and subcombinations are utility and may be employed without reference to other features and subcombinations and are contemplated within the scope of the claims. Not all steps listed in the various figures need be carried out in the specific order described.

The invention claimed is:

1. A method for providing access to facilitates in a personal hospitality site, comprising:
   accepting a biometric sample from a guest;
   comparing the biometric sample against a prestored biometric profile to authenticate the guest;
   authorizing access to the facilities in response to authenticating the guest;
   providing for the retrieval of a user profile associated with the guest; and
   providing for the communication of customized media content to the guest based on the user profile, wherein providing for said communication comprises,
   (1) providing for the reception of media content; and
   (2) limiting guest access to the media content based on the user profile.

2. The method of claim 1, where the personal hospitality site includes a selection from the following: a hotel, a hospital, an apartment complex, a time-share facility, a motel, and a cruise ship.

3. The method of claim 2, wherein accepting the biometric sample from a guest includes receiving the sample from a biometric-sample-capture device.

4. The method of claim 3, wherein the biometric-sample-capture device includes one or more of the following: a fingerprint-recognition system, a facial-recognition system, an eye-scanning system, a voice-recognition system, a DNA-recognition system, a breath-recognition system, and a hand-geometry-identification system.

5. The method of claim 4, wherein the prestored biometric profile includes a biometric sample of the guest.

6. The method of claim 5, wherein the user profile further includes guest-identifying information.

7. The method of claim 6, wherein the guest-identifying information includes one or more of the following: an address, a phone-number, a member-identifier string, and a driver's-license number.

8. The method of claim 7, wherein comparing biometric sample against the prestored biometric profile is accomplished by at least one of the following methods:
   accessing the biometric profile from a remote location across a public network;
   accessing the biometric profile from a remote location across a private network; and
   communicating the biometric profile from a remote memory location to a local memory location, wherein said local memory location is accessible by a local network.

9. The method of claim 8, wherein authorizing access to the facilities includes providing the guest with a room-access device, wherein the facilities include one or more or the following: a fitness facility, a dining area, a pool area, a lounge, a concierge facility, an exclusive area, and a floor level.

10. One or more computer-readable media having computer-useable instructions embodied thereon for performing the method of claim 1.

11. A method for checking a guest into a hospitality site, comprising:
  capturing a biometric sample from the guest using a biometric-sample-capture device;
  retrieving from a memory location coupled to the biometric-capture device a portable biometric profile containing a stored biometric sample of the guest;
  referencing the stored biometric sample against the captured biometric sample;
  approving check-in of the guest in response to referencing the biometric sample;
  providing a user profile associated with the guest in response to referencing the stored biometric sample;
  providing for the communication of customized media content to the guest based on the user profile, wherein providing for said communication comprises:
    (1) providing for the reception of media content in an Internet-networking protocol; and
    (2) limiting guest access to the media content based on the user profile.

12. The method of claim 11 wherein the biometric-sample-capture device includes one or more of the following: a fingerprint-recognition system, a facial-recognition system, an eye-scanning system, a voice-recognition system, a DNA-recognition system, a breath-recognition system, and a hand-geometry-identification system.

13. The method of claim 12, wherein referencing the stored biometric sample includes comparing the sample to a biometric sample stored in a database.

14. The method of claim 13, wherein approving check-in of the guest includes one or more of the following: providing the guest with a room-access device; processing payment information; and authenticating the guest.

15. The method of claim 14, wherein approving check-in of the guest further includes providing the guest with billing information.

16. The method of claim 15, wherein retrieving the portable biometric profile includes at least one of the following processes:
  accessing said database across a public network, wherein said database is a remotely located database;
  accessing said database across a private network, wherein said database is a remotely located database; and
  communicating said biometric profile from a remote memory location to a local memory location, wherein said local memory location is accessible by a local network.

17. The method of claim 11, further comprising customizing the guest's stay at the hospitality site based on the user profile.

18. The method of claim 17, wherein customizing the guest's stay includes customizing facility-amenity preferences.

19. The method of claim 18, wherein facility-amenity preferences include: wave-up-time preferences, check-out preferences, incentive-program preferences, health-club-usage preferences, room-location preferences, facility-access preferences, mini-bar preferences, Internet-access preferences, telephony preferences, concierge-desk preferences, business-services preferences, parking preferences, special-assistance services preferences, and laundry preferences.

20. The method of claim 19, wherein the user preferences further comprise room-environment preferences.

21. The method of claim 20, wherein the room-environment preferences include: home-page preferences, room-lighting preferences, decor preferences, room-temperature preferences, eating preferences, room-service preferences, convenience preferences, room-location preferences, sleeping-arrangement preferences, aroma preferences, restroom-amenity preferences, and smoking preferences.

22. The method of claim 21, wherein customizing the plurality of hospitality services further includes customizing media preferences.

23. The method of claim 22, wherein the media preferences include: volume preferences, television-channel preferences, language preferences, genre preferences, service-duration preferences, viewing preferences, topic preferences, ratings preferences, actor preferences, style preferences, era preferences, artist preferences, protocol preferences, and format preferences.

24. The method of claim 23, further comprising providing customized media content to the guest based on the user profile.

25. The method of claim 24, wherein the customized media content includes stored media content and real-time-delivered content.

26. The method of claim 11, wherein providing for the communication of the customized media content further includes:
  providing the media content to at least one receiving device.

27. A system for providing personal hospitality services to a guest, comprising:
  a memory component that stores a biometric sample of the guest;
  a bio metric-sample-capture component logical coupled to the memory component,
  a personal hospitality management system (PHMS) operationally coupled to the biometric-sample-capture component for personalizing the services available to the guest, said PHMS comprising,
    (1) a user profile associated with the guest;
    (2) a communications component for communicating customized media content to the guest based on the user profile,
    (3) at least one media-receiving component for receiving media content in an Internet-networking protocol; and
    (4) a restriction component that limits guest access to the media content based on the user profile.

28. The system of claim 27, wherein the memory component includes one of more of the following: a database, a magnetic-storage component, and an optical storage component.

29. The system of claim 28, wherein the biometric-sample-capture component includes one or more of the following: a fingerprint-recognition system, a facial-recognition system, an eye-scanning system, a voice-recognition system, a DNA-recognition system, a breath-recognition system, and a hard-geometry-identification system.

30. The system of claim 29, wherein the PHMS further includes:
  a user-profile database for storing the user profile and logically coupled to the biometric-sample-capture component;
  a data-entry component coupled to the database for populating the user profile;

a control module couple to the database for personalizing the plurality of hospitality services; and a guest-interface component coupled to the control module for interacting with the system.

31. The system of claim 30, wherein a user profile in the user-profile database comprises facility-amenity preferences.

32. The system of claim 31, wherein the facility-amenity preferences include: wake-up-time preferences, check-out preferences, incentive-program preferences, health-club-usage preferences, room-location preferences, facility-access preferences, mini-bar preferences, Internet-access preferences, telephony preferences, concierge-desk preferences, business-services preferences, parking preferences, special-assistance services preferences, and laundry preferences.

33. The system of claim 32, wherein a user profile in the user-profile database further comprises room-environment preferences.

34. The system of claim 33, wherein room-environment preferences include: home-page preferences, room-lighting preferences, decor preferences, room-temperature eating preferences, eating preferences, room-service preferences, convenience preferences, room-location preferences, sleeping-arrangement preferences, aroma preferences, and smoking preferences.

35. The system of claim 34, wherein a user profile in the user-profile database further comprises media preferences.

36. The system of claim 35, wherein the media preferences include: television-channel preferences, volume preferences, language preferences, genre preferences, service-duration preferences, viewing preferences, topic preferences, ratings preferences, actor preferences, style preferences, era preferences, artist preferences, protocol preferences, and format preferences.

37. The system of claim 36, wherein the data-entry component includes one of the following: a computer, a terminal, a kiosk, a telephony device, a television, a personal data assistant, a consumer-electronics device, a speaker, a guest-monitoring application, and a default-settings programming device.

38. The system of claim 37, wherein the control module comprises computer-readable code that monitors and controls of the PHMS system.

39. A computer-readable medium having a computer-useable instructions embodied thereon for causing a computer to perform a method for processing a reservation of a hospitality-site patron, the method comprising the steps of:

receiving a biometric sample from the patron using a biometric-sample-capture device;

authenticating the sample by comparing the sample against a stored biometric profile corresponding to the patron;

providing access to hospitality-site facilities in response to authenticating the sample;

providing a user profile associated with the patron;

providing for the communication of customized media content to the patron based on the user profile, wherein providing for said communication comprises:

(1) providing for the reception of media content; and (2) limiting guest access to the media content based on the user profile.

40. The computer-readable medium of claim 39, wherein the hospitality-site patron includes a patron of one or more of the following: a hotel, a hospital, an apartment complex, a time-share facility, a motel, and a cruise ship.

41. The computer-readable medium of claim 40, wherein providing access to hospitality-site facilities includes providing access to one or more or the following: a fitness facility, a dining area, a pool area, a lounge, concierge facility, an exclusive area, and a floor level.

42. An apparatus for checking a guest into a hospitality site, comprising:

means for receiving a biometric sample from a guest;

means for comparing the received sample against a pre-stored biometric sample to authenticate the guest, wherein said prestored biometric sample is accessible by a plurality of hospitality sites;

means for approving check-in of the guest in response to comparing the biometric sample; and means for providing a user profile and for access media content provided to the guest based on the use profile.

43. The apparatus of claim 42, wherein checking in a guest comprises one or more of the following: providing the guest with a room-access device; processing payment information; and providing billing information.

* * * * *